Sept. 5, 1967  KOICHI OKA  3,340,463
POWER TRANSFORMER UTILIZING HALL EFFECTS
Filed Sept. 24, 1964  3 Sheets-Sheet 1

INVENTOR
Koichi Oka

BY *Stevens, Davis, Miller + Mosher*

ATTORNEYS

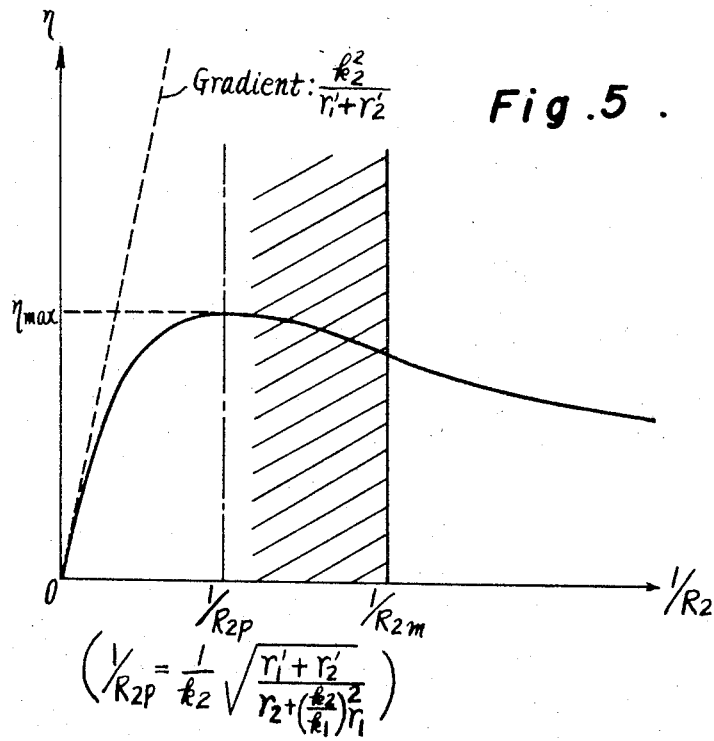
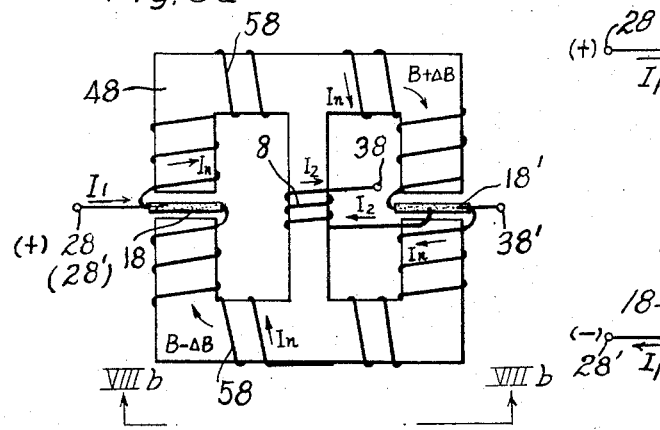
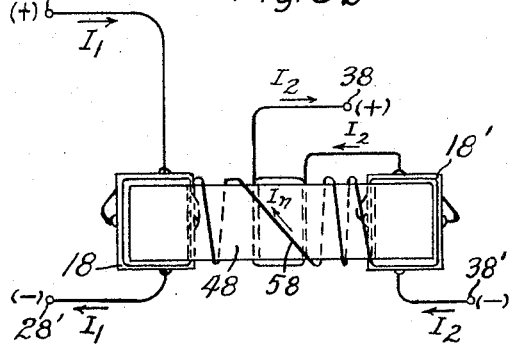

→ : Current
- - → : Electric Field

▓ Main body of a Hall effect type cell
(That portion of plasma which is subjected to a magnetic field)

▓ Electric conductor (Solid electrodes or those portions of plasma which are not subjected to a magnetic field)

United States Patent Office 3,340,463
Patented Sept. 5, 1967

3,340,463
POWER TRANSFORMER UTILIZING HALL EFFECTS
Koichi Oka, Hitachi, Japan, assignor to Hitachi Wire and Cable Limited, Tokyo, Japan, a corporation of Japan
Filed Sept. 24, 1964, Ser. No. 399,055
Claims priority, application Japan, Sept. 27, 1963, 38/50,840
5 Claims. (Cl. 323—44)

ABSTRACT OF THE DISCLOSURE

A power transformer for converting both A.C. and D.C. electric power, by using Hall effects, which comprises at least two serially connected Hall effect type electric cell means. The Hall effect type electric cell means are conventional Hall cells or plasmas with each Hall effect type electric cell means having a specific electric resistance smaller than the product of Hall coefficient thereof and the magnetic flux density of a magnetic field applied thereto.

---

This invention relates to a power transformer utilizing Hall effects and having a comparatively simple structure and a high transformation efficiency, more particularly to a novel power transformer which functions as a stationary device capable of transforming direct currents and direct current voltages immediately into different forms of direct currents and direct current voltages.

Generally speaking, the conventional transformers function as stationary converters of A.C. voltages by means of electro-magnetic induction, but they can not transform D.C. voltages.

There were no simple devices previously which could transform D.C. voltages in such an easy manner as A.C. transformers convert A.C. voltages. To convert a D.C. voltage, it has been a common practice that the D.C. voltage is first converted into an A.C. voltage, by means of a converter, second to transform the A.C. voltage thus obtained into a desired A.C. voltage by an A.C. transformer and finally rectify the A.C. voltage into another D.C. voltage. Such a complicated procedure in voltage transformation has been one of the reasons why the industrial use of direct current electricity is limited at the present.

The conventional transformers have inherent iron loss due to alternation of magnetic flux in their iron cores. In the device of the invention, the iron loss can be avoided and a very high efficiency can be attained, at least theoretically.

Figure 1:
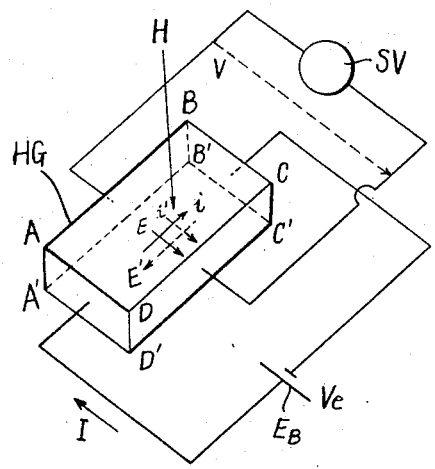
Figure 2:
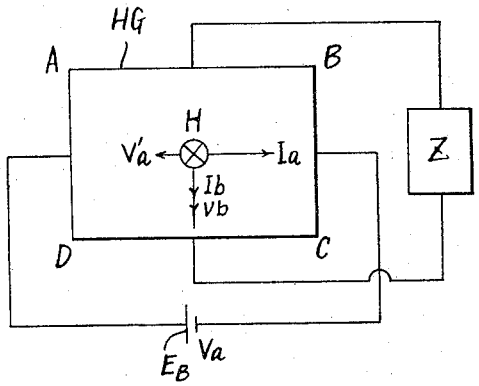
Figure 3:
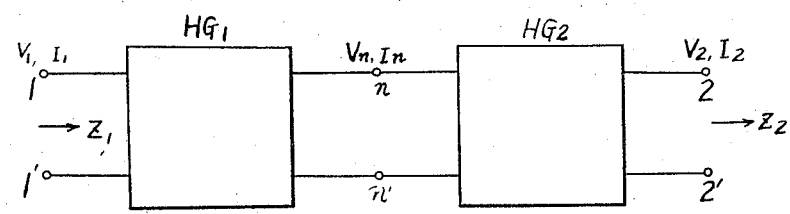
Figure 4:
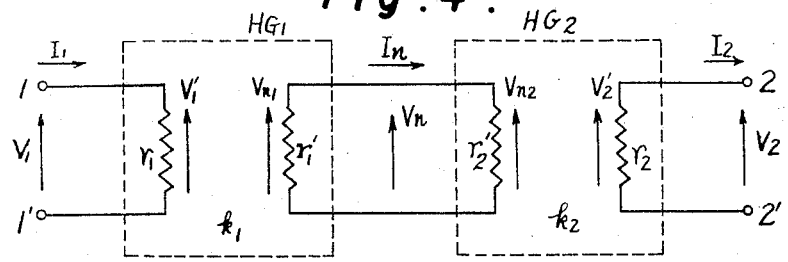
Figure 6:
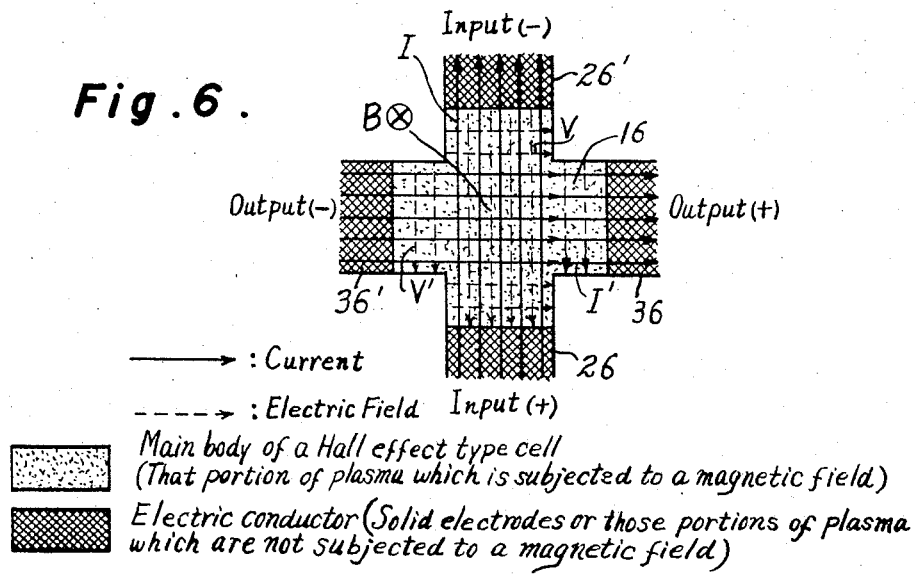
Figure 7:
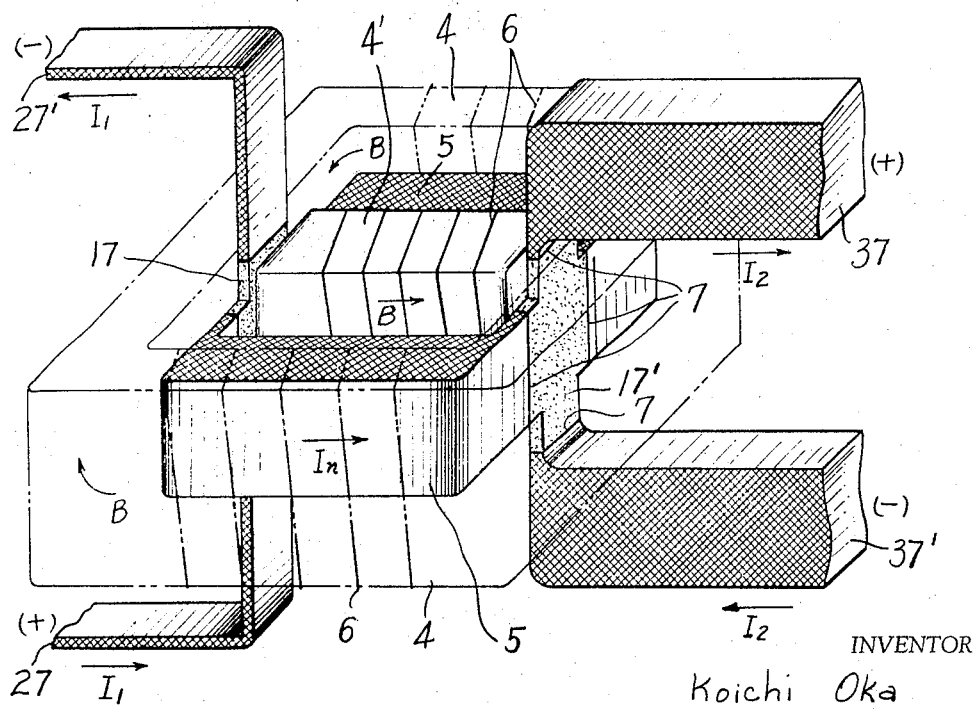

For a better understanding of the invention, reference is made to the accompanying drawings, in which FIG. 1 is a simplified perspective view illustrating the operation of a Hall effect type electric cell, FIG. 2 is an illustrative diagram of a device shown in FIG. 1, FIG. 3 is an illustrative block diagram of an embodiment of the invention having two Hall effect type electric cells connected in series, FIG. 4 is an equivalent circuit of the same, FIG. 5 is a graph showing the efficiency of a transformer according to the invention, FIG. 6 is an illustrative diagram of a Hall effect type electric cell embodying the invention, FIG. 7 is a perspective view of an embodiment of the invention, and FIGS. 8a and 8b are respectively a diagrammatic front elevation and a diagrammatic bottom view taken on the line VIIIb—VIIIb of FIG. 8a, illustrating another embodiment of the invention.

For a better understanding of the invention, the operation of the Hall effect type electric cell will now be explained referring to FIGS. 1 and 2. In FIG. 1, HG is a main body of the Hall effect type electric cell comprising a rectangular conductor or semiconducting material solid body which is equipped with four electrodes. The four electrodes consist of mutually insulated four side planes of the main body ADD'A', BCC'B', DCC'D', and ABB'A'. SV is a voltmeter. If the main body is subjected to a magnetic field H (magnetic flux density B) applied in a direction normal to the plane ABCD and an electric current I is passed across the input electrodes ADD'A' and BCC'B' from a D.C. power source $E_B$, then an electromotive force is induced in a direction normal to the plane defined by said current and said magnetic field, i.e. across the output electrodes ABB'A' and DCC'D'. Such an induction of an electro-motive force is called the Hall effect, and if the Hall effect coefficient of the material used and the current density are expressed by $R_H$ and $i$ respectively, then the produced electric field E is given by $$E = R_H \times B \times i \tag{1}$$

The voltage induced across the electrodes and the total current supplied from input terminals are expressed in terms of the induced electric field and the current density by $$V = E \times \overline{AD} \tag{2}$$
$$I = i \times (AD') \tag{3}$$

here, $\overline{AD}$ is the length of one side AD, and (AD') is the area of the rectangle ADD'A'.

The device shown in FIG. 1 is usually called a Hall effect type electric cell or a Hall generator, by substituting Formulae 2 and 3 into 1, one obtains $$k = \frac{V}{I} = \frac{E \cdot \overline{AD}}{i \cdot (AD')} = \frac{B \cdot R_H}{AA'} \tag{4}$$

here, $\overline{AA'}$ is the length of the side AA'. The constant $k$ will be called a cell constant of the Hall effect type electric cell:

In the foregoing, the explanation was made about the fact that the voltage V is generated by the current supplied from the power source $V_e$, and now the effects of applying another current having a current density of $i'$ to the Hall effect type electric cell in the same direction with E will be considered. Judging from the symmetry between the induced electric field E and the current density $i'$ in the Hall effect type electric cell, it will be understood that an electric field E' is induced by the current density $i'$ as shown in FIG. 1. If the induced voltage and the current are represented by V' and I' respectively, the cell constant $k'$ of the Hall effect type electric cell is given by $$k' = \frac{V'}{I'} = \frac{E' \cdot \overline{AB}}{i' \cdot \overline{AB'}} = \frac{B \cdot R_H}{AA'} \tag{5}$$

Comparing the formulae 4 and 5, it is apparent that $$k' = k \tag{6}$$

FIG. 2 is an illustrative diagram of the device shown in FIG. 1 after replacing the voltmeter with a load impedance and modifying the symbols for voltages and currents, in which $V_a$ and $I_a$ are a voltage and a current at the input electrodes, and $V_b$ and $I_b$ are a voltage and a current at the output electrodes.

When the current $I_a$ flows while a magnetic field H is applied in a direction from the front surface of the paper to its backside, a Lorentz's force appears and an electromotive force $V_b$ is induced. (The phenomenon can be easily understood by considering the current as a flow of electrons in the direction opposite to that of the current and applying the Fleming's left hand law to find that sense of the induced electric field by the flow of electrons and the magnetic field applied. FIG. 2 shows the effects of currents due to electrons, and for currents due to holes the sense of $V_b$ and $I_b$ will be reversed with respect to those shown in FIG. 2.) Accordingly, a current $I_b$ will flow through the load impedance Z in the direction of $V_b$. Due to the current $I_b$ and the magnetic field H, a voltage $V'_a$ will be induced in the contrary direction to that of $I_a$.

If the cell constant of the Hall effect type electric cell is assumed to be $k$, the following relations can be easily derived from Equations 4, 5 and 6.

$$V_b = kI_a \quad (7)$$
$$V'_a = kI_b \quad (8)$$
$$V_a - V'_a = I_a \times R_a \quad (8)'$$

here, $R_a$ is an internal resistance between the input electrodes.

If the internal resistance is assumed to be zero for an ideal cell, the following relations should be satisfied.

$$V_a - V'_a = I_a \times 0 \quad (9)$$
$$\therefore V_a = V'_a \quad (10)$$
$$V_a = kI_b \quad (11)$$
$$V_b = kI_a \quad (12)$$

The relations shown in Formulae 11 and 12 are sometimes used as gyrators in communication engineering.

The principles of the invention will now be explained referring to FIG. 3, which is a block diagram of an ideal transformer consisting of two series connected Hall effect type electric cells as shown in FIGS. 1 and 2. In FIG. 3, $HG_1$ and $HG_2$ are Hall effect type electric cells and when an input voltage $V_1$ and an input current $I_1$ are applied across the terminals 1 and 1', an output voltage $V_2$ and an output current $I_2$ will be given at the terminals 2 and 2', and at terminals $n$ and $n'$ there will appear a voltage $V_n$ and a current $I_n$. It is apparent from the foregoing descriptions that following relations are satisfied by the voltages and currents in the circuit.

$$V_n = k_1 I_1 \quad (13)$$
$$V_1 = k_1 I_n \quad (14)$$
$$V_2 = k_2 I_n \quad (15)$$
$$V_n = k_2 I_2 \quad (16)$$

Hence, $$\frac{V_2}{V_1} = \frac{k_2}{k_1} \quad (17)$$

$$\frac{I_2}{I_1} = \frac{k_1}{k_2} \quad (18)$$

$$\frac{Z_2}{Z_1} = \frac{V_2/I_2}{V_1/I_1} = \left(\frac{k_2}{k_1}\right)^2 \quad (19)$$

$$V_1 \cdot I_1 = V_n \cdot I_2 \quad (20)$$

here, $Z_1$: Impedance as seen from the primary side, $Z_2$: Impedance as seen from the secondary side. The magnitudes of voltage, current and impedance at the terminals 1 and 1' are converted into those at the terminals 2 and 2' at ratios given by Equations 17, 18, and 19 respectively, and the Equation 20 indicates that the power is also transferred in both directions without loss. Such transformers as shown in FIG. 3 will be called an ideal transformer hereinafter.

The actual internal resistance of Hall effect type electric cells, however, is substantially high in reality, and such resistances are not negligible at all. Accordingly, the ideal transformers have had only academic interests heretofore and they have never been used for practical purposes in industries.

The invention is to provide practical ideal transformers of this kind, the essential points of which will be explained below.

At first, the transformation of voltages and currents will be analyzed considering the internal resistances in practical Hall effect type electric cells. FIG. 4 illustrates an equivalent circuit of FIG. 3 including internal resistances using following symbols.

$HG_1$: Hall effect type electric cell on the input side
$HG_2$: Hall effect type electric cell on the output side
1–1': Input terminals (primary terminals)
2–2': Output terminals (secondary terminals)
$V_1, I_1$: Voltage and current at the input terminals
$V_2, I_2$: Voltage and current at the output terminals
$V_1'$: Induced internal electro-motive force within the electric cell $HG_1$ in a direction toward the primary terminals
$V_2'$: Induced internal electro-motive force within the electric cell $HG_2$ in a direction toward the secondary terminals
$r_1$: Internal resistance of $HG_1$ taken across the primary terminals
$r_2$: Internal resistance of $HG_2$ taken across the secondary terminals
$r_1', r_2'$: Internal resistances of $HG_1$ and $HG_2$ respectively, taken across the intermediate connecting terminals
$V_n, I_n$: Voltage and current at the intermediate connecting terminals
$V_{n1}, V_{n2}$: Induced interval voltages within electric cells $HG_1$ and $HG_2$ respectively in directions toward intermediate connecting terminals
$k_1, k_2$: Cell constants of electric cells $HG_1$ and $HG_2$ respectively There are following relations among the above quantities.

In the electric cell $HG_1$, $$V_{n1} = k_1 I_1 \quad (21)$$

and $$V'_1 = k_1 I_n \quad (22)$$

In the electric cell $HG_2$, $$V_{n2} = k_2 I_2 \quad (23)$$

and $$V'_2 = k_2 I_n \quad (24)$$

On the intermediate connecting side of the electric cell $HG_1$, $$V_{n1} - V_n = I_n r_1' \quad (25)$$

On the intermediate connecting side of the electric cell $HG_2$, $$V_n - V_{n2} = I_n r_2' \quad (26)$$

On the primary side of the electric cell $HG_1$, $$V_1 - V'_1 = I_1 r_1 \quad (27)$$

On the secondary side of the electric cell $HG_2$, $$V'_2 - V_2 = I_2 r_2 \quad (28)$$

By using the above relations, $V_2$ and $I_2$ can be given as functions of $V_1$ and $I_1$ in the following equations.

$$V_2 = \left\{\frac{k_2}{k_1} + \frac{r_2(r_1' + r_2')}{k_1 k_2}\right\} V_1 - \left\{\frac{k_2}{k_1} r_1 + \frac{k_1}{k_2} r_2 + \frac{r_1 r_2(r_1' + r_2')}{k_1 k_2}\right\} I_1 \quad (29)$$

$$I_2 = \left\{\frac{k_1}{k_2} + \frac{r_1(r_1' + r_2')}{k_1 k_2}\right\} I_1 - \left\{\frac{r_1' + r_2'}{k_1 k_2}\right\} V_1 \quad (30)$$

If the load resistance on the secondary side of the transformer is assumed to be $R_2$, then $$V_2 = R_2 I_2 \quad (31)$$

and by substituting the Formula 31 to Equations 29 and 30, mutual relations of $V_1, V_2, I_1$ and $I_2$ are given by $$\begin{cases} V_1 = KV_2 & (32) \\ I_1 = K'I_2 & (33) \end{cases}$$

$$\begin{cases} V_1 = (K/K')R_2 I_1 & (34) \\ V_2 = R_2 I_2 & (35) \end{cases}$$

$$\begin{cases} V_1 = KR_2 I_2 & (36) \\ I_1 = (K'/R_2)V_2 & (37) \end{cases}$$

here, $$K = \left\{\frac{k_1}{k_2} + \frac{r_1(r_1' + r_2')}{k_1 k_2}\right\} + \frac{1}{R_2}\left\{\frac{k_1}{k_2}r_2 + \frac{k_2}{k_1}r_1 + \frac{r_1 r_2(r_1' + r_2')}{k_1 k_2}\right\} \quad (38)$$

$$K' = \frac{k_2}{k_1} + \frac{R_2(r_1' + r_2')}{k_1 k_2} + \frac{r_2(r_1' + r_2')}{k_1 k_2} \quad (39)$$

and $$Z_1 = (K/K') \cdot R_2 \quad (40)$$

The impedance $Z_1$ represents an impedance seen from the input side.

If the internal resistances of the main bodies of the Hall effect type electric cells are sufficiently smaller than the cell constants of the main bodies of Hall effect type electric cells and the load is sufficiently small to satisfy and $$\begin{cases} k \gg r & (41) \\ R_2 \gg r & (42) \end{cases}$$

where $k$ represents $k_1$ and $k_2$ and $r$ represents $r_1$, $r_2$, $r_1'$ and $r_2'$, then the Formula 38 is simplified into $$K = \frac{k_1}{k_2} \quad (43)$$

and the Formula 32 becomes $$V_1 = \frac{k_1}{k_2} V_2 \quad (44)$$

The Equation 44 shows that the voltage transforming ratio is kept constant regardless of the load size, if the cell constants $k_1$ and $k_2$ are not changed. In order to vary the transforming ratio to a particular value, suitable cell constants should be selected so as to meet the conditions for the value which is determined by the Formula 44.

On the other hand, the current transforming ratio varies as $k'$ varies in accordance with the variation of the load resistance $R_2$, but such variation presents no essential effects on the performance of the transformer as a voltage transformer. Even when the Formula 42 is not satisfied exactly, the Equation 43 is satisfied approximately, because it is apparent from the Formula 38 that $K$ varies as a hyperbolic function of $R_2$ and the value of $K$ approaches quickly to the asymptote $k_1/k_2$.

The essential principle of the transformer of the invention is based on the fact that if at least the cell constants of the Hall effect type electric cells are sufficiently large compared with the internal resistances of said Hall effect type electric cells as shown in the Formula 41, and if preferably the load impedance is larger than the internal resistances of the Hall effect type electric cells, the transformer consisting of such Hall effect type electric cells has practicable characteristics.

The operational characteristics of the device of the invention, such as the efficiency and the voltage regulation, will now be explained.

During the transformation, the internal resistances of the Hall effect type electric cells generate Joule's heat which is the cause of loss of the transforming device. Deriving from Formulae 32 and 33, the loss $W$ is given by $$W = V_1 I_1 - V_2 I_2 \quad (45)$$

$$= (KK' - 1) V_2 I_2 \quad (46)$$

In the conditions and $$\begin{cases} k \gg r & (47) \\ R_2 \gg r & (48) \end{cases}$$

since $R_2$ represents the load resistance the Formula 48 gives less influence than the Formula 47, hence the Formulae 38 and 39 can be modified as follows:

$$K = \frac{k_1}{k_2} + \frac{1}{R_2}\left(\frac{k_1}{k_2}r_2 + \frac{k_2}{k_1}r_1\right) \quad (49)$$

$$K' = \frac{k_2}{k_1} + \frac{R_2(r_1' + r_2')}{k_1 k_2} \quad (50)$$

Therefore, $$W = w V_2 I_2 \quad (51)$$

here, $$w = \frac{1}{R_2}\left(r_2 + \frac{k_2^2}{k_1^2}r_1\right) + R_2\left(\frac{r_1' + r_2'}{k_2^2}\right) \quad (52)$$

In the Formula 52, the first term plays a major role when the load is large, and the second term is important when the load is small.

It is apparent from the foregoing descriptions that the efficiency $\eta$ is given by $$\eta = \frac{V_2 I_2}{V_1 I_1} = \frac{1}{KK'} \quad (53)$$

or $$= \frac{1}{1 + w} \quad (54)$$

FIG. 5 shows the relation of the Formula 54 as a curve by indicating the magnitude of the load by $1/R_2$. When the load resistance $R_2$ is $$R_2 = k_2 \sqrt{\frac{r_2 + (k_2/k_1)^2 r_1}{r_1' + r_2'}} \quad (55)$$

then the efficiency reaches the maximum value which is given by $$\eta \max. = \frac{1}{1 + \frac{2}{k_2}\sqrt{(r_1' + r_2')\left(r_2 + \frac{k_2^2}{k_1^2}r_1\right)}} \quad (56)$$

The above formulae show that if the Hall effect type electric cells are manufactured so that $k_1 = k_2$ and $r_1 = r_2 = r_1' = r_2'$ are satisfied, then it is advantageous to select such a rated load resistance $R_{2m}$ as $$R_{2m} \approx k_2 \quad (57)$$

The efficiency curve shown in FIG. 5 is for $R_2$ smaller than $k_2$ and the load range within the shaded area seems to be practicable.

The voltage regulation $\epsilon$ will be considered next by assuming that the primary voltage $V_1$ is kept constant. The voltage regulation is given by $$\epsilon = \frac{V_{20} - V_2}{V_{20}} \quad (58)$$

$$= \frac{V_1/K_0 - V_1/K}{V_1/K_0} = \frac{K - K_0}{K} \quad (59)$$

where $V_{20}$ and $K_0$ represent values of $V_2$ and $K$ when no load is applied ($R_2 = \infty$).

Substituting the Formula 49 into the Formula 59, one obtains $$\epsilon = \frac{\frac{1}{R_2}\left(\frac{k_1}{k_2}r_2 + \frac{k_2}{k_1}r_1\right)}{\frac{k_1}{k_2} + \frac{1}{R_2}\left(\frac{k_1}{k_2}r_2 + \frac{k_2}{k_1}r_1\right)} \quad (60)$$

If $R_2 \gg r$, $$\epsilon \approx \frac{r_2 + (k_2/k_1)^2 r_1}{R_2} \quad (61)$$

Further, if $r_1$ and $r_2$ are approximately the same, $$\epsilon \approx \frac{r_2}{R_2} (k_1 > k_2) \quad (62)$$

or $$\epsilon \approx \frac{r_1}{R_1} (k_1 < k_2) \quad (63)$$

here, $R_1 = (k_2/k_2)^2 R_2$: Load resistance as seen from the primary side

The above formula gives approximate value of the voltage regulation, and if the load resistance is selected to be substantially large compared with $r_1$ and $r_2$, a transformer device, having a very small voltage regulation can be obtained.

The Formulae 41 and 42 can be expressed by the inherent constants of the Hall effect type electric cell.

$$BR_H \gg \rho \tag{64}$$

$$R_2 \gg \frac{L}{S}\rho \tag{65}$$

here, $R_H$: all coefficient of the Hall effect type electric cell
B: Magnetic flux density applied to the Hall effect type electric cell
$\rho$: Specific resistance of the main body of the Hall effect type electric cell
$R_2$: Load resistance
L: Length of a side of a plane of the main body of the Hall effect type electric cell which is perpendicular to the direction of the magnetic field (length of $\overline{AB}$ or $\overline{AD}$ in FIG. 1)
S: Area of the plane of the main body of the Hall effect type electric cell which is perpendicular to the direction of the current in said body (area of the rectangle ADD'A' or ABB'A' in FIG. 1)

One of the basic principles of the invention, that is the internal resistance of the Hall effect type electric cell being smaller than the cell constant of the Hall effect type electric cell, can be paraphrased in inherent constants of the main body of the Hall effect type electric cell, that is the specific resistance of the main body of the Hall effect type electric cell being smaller than the product of the Hall coefficient and the magnetic flux density applied.

It has been very difficult to select a Hall effect type electric cell satisfying the above conditions, but the inventor found that electric cells made of plasmas meet said requirement very well. An example using a plasma will now be explained.

It is well known that the carriers of conductive electric current in a plasma are mostly electrons. If the density of electrons and the electric charge of an electron are assumed to be ($Nm^{-3}$) and $e$ (coulomb), the Hall coefficient of the plasma is given by $$R_H = \frac{1}{NE} \frac{m^3}{\text{coulomb}} \text{ or } \frac{1}{Ne} \frac{V \cdot m^3}{A \cdot W_b} \tag{66}$$

here, $W_b$: weber.

The charge $e$ is $1.60 \times 10^{-19}$ coulomb, as is well known, and the density of electrons in a plasma is usually much smaller compared with that of a metal at a room temperature, hence $R_H$ is much larger on the contrary. The specific resistance of a plasma is at most $$\rho = \frac{1.96 \times 10^3}{T^{3/2}} (\Omega \cdot m) \tag{67}$$

here, T: temperature of the plasma in (°K.). By keeping the plasma at a high temperature, the specific resistance thereof can be maintained the same or lower than that of a metal at a room temperature. The specific resistance varies to a certain extent by magnetization, however, since such variation is at most 2 times, it is not considered here.

For example, if a magnetic field having a flux density $B=10$ kg.$(=1$ Wb./m.$^2)$ is applied to a plasma having $$N = 10^{12} \text{cm.}^{-3} (= 10^{18} \text{m.}^{-3})$$

and $$T = 10 \text{ °K.}$$

then $$BR_H = 6.25 (\Omega \cdot m) \tag{68}$$

$$\rho = 1.96 \times 10^{-3} (\Omega \cdot m) \tag{69}$$

therefore, $$BR_H \gg \rho$$

As shown in the Formula 65, $\rho$ being $1.96 \times 10^{-3}(\Omega \cdot m)$, it is not significant for all practical purposes unless the load is short circuited.

In Formula 68, the unit of the quantity $B \cdot R_H$ is indicated, for simplicity, by $(\Omega \cdot m)$, even though the more exact expression for it is $(V/A \cdot m)$. When an electric current having a current density of 1 A./m.$^2$ is fed through a Hall effect type electric cell so as to intersect with the magnetic flux in said electric cell at right angles, the flux magnitude being 1 Wb./m.$^2$, if the magnitude of the voltage generated across the electric cell in the direction perpendicular to both electric current and the magnetic flux is 1 v./m., then the cell constant of the Hall effect type electric cell is 1 $\Omega$ or 1 v./A. In other words, the dimension of the cell constant is in coincidence with that of electric resistance, i.e., ohm. The physical meaning of such unit of the cell constant, however, is different from that of the electric resistance. In the case of the cell constant, the direction of voltage must be taken at right angles to that of the current, while in the case of the electric resistance, there is no specific angular relations required between the voltage and the current. Besides, electric resistance acts as a cause of energy loss in electric circuit, but the cell constant does not act a direct cause of such energy loss. The above electron density N of $10^{12}$ cm.$^{-3}$ for a plasma can be easily derived by considering the pressure $p$ and temperature T of the plasma and the ionization potential $Vi$ of the gas. The electron density N is given by the Boyle-Charles' formula $$\frac{p}{\chi T} = (N_0 - N) + N + N \tag{71}$$

and the Saha's ionization formula $$\frac{\tau^2}{1-\tau^2} \frac{p}{\chi T} = 2 \left(\frac{2\pi m \chi T}{h}\right)^{3/2} \exp. \left(-\frac{eVi}{\chi T}\right) \tag{72}$$

where, $\tau$: Degree of electrolytic dissociation $= N/N_0$
$N_0$: Density of neutral atoms prior to ionization
$\chi$: Boltzmann's constant, $138 \times 10^{-16}$ erg./° K.
$h$: Planck's constant, $6.63 \times 10^{-27}$ erg./sec.
$e$: Electric charge of an electron, $1.60 \times 10^{-19}$ coulomb
$m$: Static mass of an electron, $9.11 \times 10^{-28}$ g.

By combining the Formulae 71 and 72, one obtains $$p = 2\chi NT + \frac{h^3}{2(2\pi m)^{3/2} \chi^{1/2}} \times \frac{N^2 \exp. \left(\frac{eVi}{\chi T}\right)}{\sqrt{T}} \tag{73}$$

substituting above constants $$p = 2.07 \times 10^{-19} NT + 2.15 \times 10^{-35} \times \frac{N^2 \exp. (1.16 \times 10^4 \times ViT)}{\sqrt{T}} \tag{74}$$

here, $p$: Pressure in the plasma (mm. Hg)
N: Density of electrons in the plasma (cm.$^{-3}$)
T: Temperature of the plasma (° K.)
$Vi$: Ionization potential of the gas (V.)

Accordingly, to obtain said density of electrons of $N=10^{12}$ cm.$^{-3}$ ($T=10^4$ ° K.), the necessary pressure for hydrogen gas ($Vi=13.5$ volt) is given by $$p = 2.07 \times 10^{-3} \text{ mm. Hg} \tag{75}$$

then the gas is almost completely ionized with the degree of electrolytic dissociation $\tau \approx 1$.

FIGS. 6 and 7 illustrate an example embodying the transformer device of the invention using a plasma. FIG. 6 shows the structure of an electrode of a Hall type electric cell using a plasma. Theoretically speaking, a Hall effect type electric cell can be formed in a rectangular plate and placed in a magnetic field, with the largest surface thereof set at right angles to the direction of a magnetic field to be applied thereon, so that a pair of opposite side walls thereof, set in parallel with the direction of the magnetic field, can be used as electrodes for an input current while another pair of opposite side walls thereof can be used as electrodes for an output voltage. However, in an actual Hall effect type electric cell, if the entire span of each pair of opposite side walls are used as electrodes, an electric current flowing betwen a pair of electrodes is apt to partially leak to electrodes belonging to another pair.

The electrode structure of FIG. 6 was selected considering the above leakage. The reference numeral 16 is a plasma, 26 and 26' input electrodes consisting of electrically conductive materials, and 36 and 36' are output electrodes. A magnetic field having a flux density of B is applied to the plasma portion, for instance, by placing the plasma 16 in a suitable enclosure located in a gap between two magnetic poles of opposite polarities, and an input current shown by solid line narrows I is fed through the plasma 16, thereby an electric field shown by dotted line arrows V is generated, as illustrated in FIG. 6. Since the plasma should be kept at a high temperature during operation, those portions of electrodes which are held in contact with the plasma must be made of heat-resistant and heat-insulating materials. For simplicity, only the plasma itself is shown in FIGS. 6 and 7, but it should be understood that such plasma is actually retained in a cross-shaped, gastight shell made of suitable heat-resistant material. It is not necessary to restrict the magnetic field only to the cross-shaped area, but such magnetic field can be applied to an area inclusive of the entire cross shape of plasma. An example of such heat-resistant and heat-insulating materials for enclosing plasma is magnesia. In the art of magneto-hydrodynamic generation, magnesia has already been utilized as the material for containers of plasmas.

Referring to FIG. 7, which shows an embodiment of the device according to the invention, 17 and 17' are a plasma of low density and another plasma of high density respectively, 27 and 27' input terminals, and 37 and 37' are output terminals. The plasmas 17, 17' are connected in cascade by a pair of connecting conductors 5, while the plasma 17 is connected to input terminals 27, 27' and the other plasma 17' is connected to output terminals 37, 37'. In the particular embodiment shown in FIG. 7, the input terminals 27, 27' are intended to carry a small current while the output terminals 37, 37' are intended to carry a large current, and hence, the input terminals have smaller cross-sectional area than that of the output terminals. An iron core 4 surrounds the plasmas 17 and 17' and the connecting conductors 5, and for the purpose of simplified illustration only the edge lines of the iron core are shown by assuming the solid iron portions were transparent. An iron core leg 4' is inserted within the area defined by the connecting conductor 5, and iron cores 4 and 4' constitute a three-legged iron core, and the plasmas 17 and 17' are inserted in gaps defined by the iron cores 4 and 4' at both ends of 4'. A power source of high voltage with low current will be thus transformed into another power source of low voltage with large current at a high efficiency. Exciting windings 6 are wound around the iron cores 4 and 4' in such a manner that, upon application of an exciting voltage across such exciting windings, magnetic flux shown by the arrow B is generated therein. The three windings 6 of FIG. 7 can be connected in series by using a single electric conductor or can be wound separately as independent windings.

FIG. 6 shows only one plasma, while in the case of the embodiment shown in FIG. 7, two plasmas are shown; namely, a low density plasma 17 and a high density plasma 17' connected to plasma 17 in cascade by bonding the output electrodes of the plasma 17 with the input electrodes of the plasma 17' through a pair of connecting conductors 5. Since the plasmas should be kept at a high temperature during operation of the transformer, connections 7 between the electrodes and the plasmas must be made of heat-resistant and heat-insulating materials, as described in the foregoing.

In the example shown in FIG. 7, the iron core is magnetized from an outside power source, however, it can be magnetized by using a part of the current of the transformer device itself. The latter type will be called a self-exciting type transformer. As the load current increases the voltage regulation will be increased as can be seen from the Formula 61, but the voltage regulation can be limited to a very low value by compensating the transformation ratio, and a transformer equipped with such compensation will be called a compensated type transformer.

FIGS. 8a and 8b show a schematic front elevation and a schematic bottom view respectively of an embodiment provided with self magnetization by using a transformer current at the connecting portion of the transformer device and compensation by using a portion of the load current. In FIGS. 8a and 8b, 18 and 18' are a plasma of low density and another plasma of high density respectively, 28, 28' and 38, 38' input terminals and output terminals, 48a three-legged iron core. The connecting conductors 58 of the plasma electric cells 18 and 18' also function as magnetizing winding to produce the desired magnetic flux density B by means of the current $I_n$ at the connecting portion. The center leg is provided with a compensating winding 8 to produce a compensating flux density $\Delta B$ by means of the output current $I_2$.

For instance, the structure of a transformer device according to the invention having ratings of primary voltage 20 kv., primary current 50A., secondary voltage 1500 v., and secondary current 660A. was made and the characteristics of said transformer are as follows.

The plasma as shown in FIG. 7 was made by using argon gas after seeding 1% of cesium, keeping the temperature of the plasma at about a little over 2000° K., making the effective volume of the plasma $$120 \text{ mm.} \times 120 \text{ mm.} \times 20 \text{ mm.}$$

considering the effects of the magnetic field and others, and applying the magnetic field having a magnetic flux density of 10 kg.

With the structure shown in FIG. 7, it is made possible to obtain a transformation efficiency of about 70 percent together with a comparatively large voltage regulation (about 30 percent). Moreover, such operative characteristics can be further improved by utilizing the structure shown in FIGS. 8a and 8b.

From the foregoing descriptions, the features of the invention will be summarized as follows.

(1) Transformation of a direct current and a D.C. voltage is possible.
(2) The density of power in the transformation is very high.
(3) The transformation ratio can be taken very high because said ratio is determined by the density of electrons in the plasma, the density of the magnetic flux applied, and the dimensions of the electric cell.
(4) The transformation efficiency is theoretically not limited.
(5) The transformation ratio can be easily regulated by modifying the magnetic field, thus simple on-load-voltage-regulation is possible.
(6) The principles and the structures are simple.
(7) The transformer is a stationary device.

In the foregoing descriptions and the example, series connected two electric cells are used, however various suitable modifications can be made depending on the situations such as connecting two of the parallel connected electric cells in series, or connecting more than two electric cells in series, etc.

The invention is not limited to the above example, but it is, of course, applicable to other variable devices without changing the essential principles of the invention.

What I claim is:

1. A power transformer having input and output terminals comprising at least a first and a second Hall effect type electric cell means, each said Hall effect type electric cell means having a pair of input electrodes and a pair of output electrodes, and magnetic flux producing means for applying a magnetic field to each said Hall effect type electric cell means, said first Hall effect type electric cell means having the output electrodes thereof connected to the input electrodes of said second Hall effect type electric cell means through connecting electric conductor means, the input electrodes of said first Hall effect type electric cell means being connected to said input terminals of the transformer, said output electrodes of said second Hall type electric cell means being connected to said output terminals, the specific resistance of each said Hall effect type electric cell means being smaller than the product of the Hall coefficient thereof and the magnetic flux density of the magnetic field applied thereto.

2. A power transformer according to claim 1, in which plasmas confined by gas-tight shells made of heat-resistant material are used as said Hall effect type electric cell means.

3. A power transformer according to claim 1, in which said magnetic flux applied to said Hall effect type electric cell means is induced by using an intermediate electric current between said first and second Hall effect type electric cell means, said intermediate electric current flowing through conductors connecting the output electrodes of said first Hall effect type electric cell means to the input electrodes of said second Hall effect type electric cell means, and said connecting conductors forming a part of said magnetic means.

4. A power transformer according to claim 1, in which said magnetic flux applied to said Hall effect type electric cell means is regulated by using an output current from said second Hall effect type electric cell means, said output current flowing through a compensating winding inserted between one output electrode of said second Hall effect type electric cell means and one of the output terminals, said compensating winding being set at a position which is to influence the compensating flux to said magnetic flux of said magnetic field, whereby the output voltage at the output terminals of the transformer is maintained at a substantially constant level.

5. A power transformer according to claim 1, in which said magnetic flux applied to said Hall effect type electric cell means is induced by an outside power source.

References Cited

UNITED STATES PATENTS

| | | | |
|---|---|---|---|
| 2,941,163 | 6/1960 | Hess | 323—94 |
| 2,987,631 | 6/1961 | Park. | |
| 2,988,650 | 6/1961 | Weiss | 323—94 |
| 2,988,707 | 6/1961 | Kuhrt et al. | 323—94 |
| 3,255,404 | 6/1966 | Kidwell | 323—44 |
| 3,286,161 | 11/1966 | Jones et al. | 323—94 |

JOHN F. COUCH, *Primary Examiner.*

A. D. PELLINEN, *Assistant Examiner.*